United States Patent [19]

Chen et al.

[11] Patent Number: 5,448,560
[45] Date of Patent: Sep. 5, 1995

[54] V.110 COMMUNICATION PROTOCOL FRACTIONAL RATE ADAPTER FOR AN ISDN NETWORK

[75] Inventors: Chi-Chang Chen, Taichung; Shian-Ming Tzeng, Taoyuan, both of Taiwan

[73] Assignee: ITRI, Chutung, Taiwan

[21] Appl. No.: 996,829

[22] Filed: Dec. 23, 1992

[51] Int. Cl.⁶ ............................................. H04J 3/22
[52] U.S. Cl. ........................................ 370/84; 370/99; 370/102; 370/105.1; 370/110.1
[58] Field of Search ............. 370/58.1, 58.2, 58.3, 370/60, 60.1, 79, 84, 94.1, 94.2, 99, 102, 110.1, 112, 105.1; 375/7, 8

[56] References Cited

U.S. PATENT DOCUMENTS

| | | | |
|---|---|---|---|
| 4,641,303 | 2/1987 | Vogl | 370/84 |
| 4,797,904 | 1/1989 | Dekker et al. | 375/7 |
| 4,935,923 | 6/1990 | Shimizu et al. | 370/110.1 |
| 4,953,180 | 8/1990 | Fieschi et al. | 370/84 |
| 4,970,723 | 11/1990 | Lin | 370/110.1 |
| 4,979,169 | 12/1990 | Almond et al. | 370/79 |
| 4,987,570 | 1/1991 | Almond et al. | 370/84 |
| 5,177,738 | 1/1993 | Dell'Oro et al. | 370/84 |

OTHER PUBLICATIONS

William Stallings "ISDN An Introduction" CH 8 pp. 304–314 (1989).

*Primary Examiner*—Alpus Hsu
*Attorney, Agent, or Firm*—Meltzer, Lippe, Goldstein

[57] ABSTRACT

A system and method are disclosed for adapting the rate of a data terminal equipment having a V-series type interface connected to an integrated services digital network which supports more than two simultaneous communications. A V.110 rate adapter is provided which receives user data at a user data rate from the data terminal equipment and outputs a bitstream containing the user data at a B-channel data rate. A fractional rate adapter is also provided which receives this bitstream and outputs a second bitstream at a lower subchannel data rate using a bit discarding technique.

13 Claims, 8 Drawing Sheets

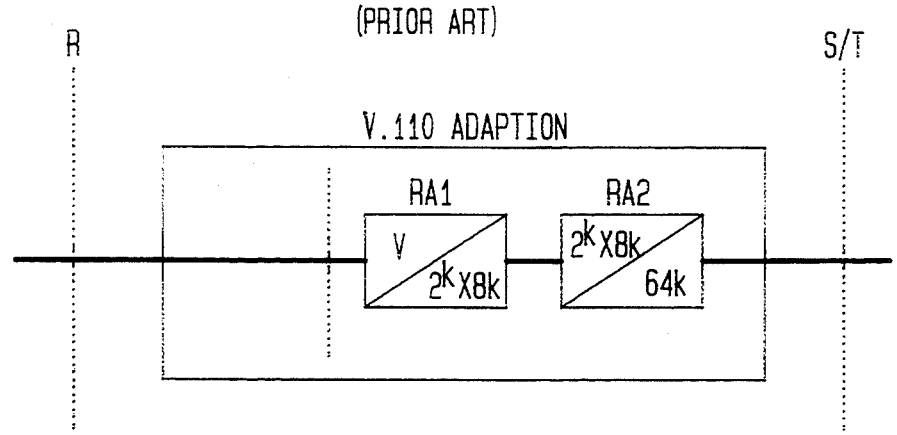
FIG. 2
(PRIOR ART)
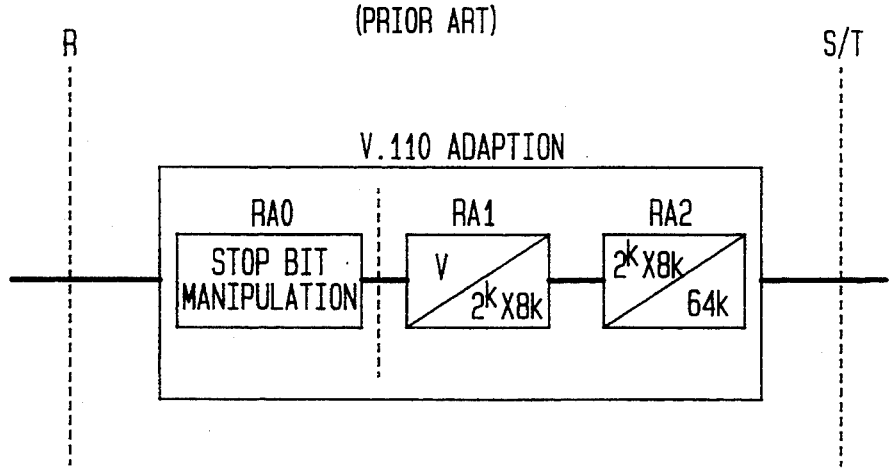
FIG. 3
(PRIOR ART)
(a) 8-kbps STREAM
(b) 16-kbps STREAM
(c) 32-kbps STREAM
FIG. 4
(PRIOR ART)

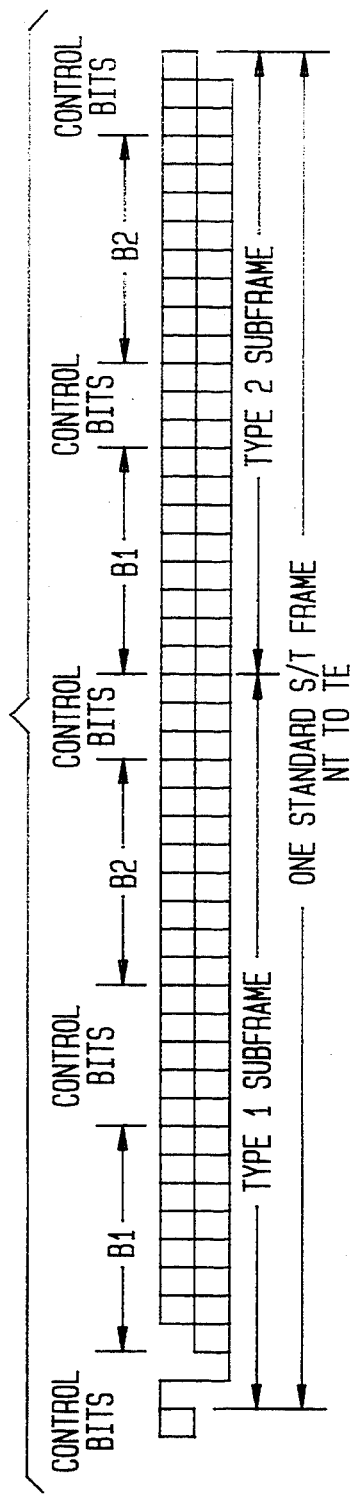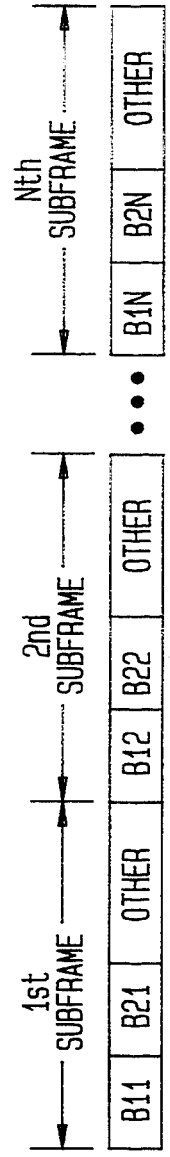
FIG. 5A
FIG. 5B
LOGIC REPRESENTATION OF ONE MULTIFRAME

V.110 COMMUNICATION PROTOCOL FRACTIONAL RATE ADAPTER FOR AN ISDN NETWORK

RELATED APPLICATION

The following applications are assigned to a common assignee hereof and contain subject matter related to the subject matter of the present application:
1. "System for Providing Simultaneous Multiple Circuit-Switched Type Communications on an ISDN Basic Rate Interface", filed for Chi-Chang Chen, Bor-Shen Wu, Jen-Yung Ling, and Min-Chang Lin on May 14, 1992, bearing the Ser. No. 07/882,784.
2. "Adapter for Transmission Lines Using HDLC Frames", filed for Chi-Chang Chen, Shian-Ming Tzeng and Chen-Chi Fan on Jun. 30, 1992, bearing the Ser. No. 07/906,612, now abandoned.

The contents of the above listed applications are incorporated herein by reference.

FIELD OF THE INVENTION

This invention relates to an integrated services digital network (ISDN) basic subscriber access system. In particular, the present invention relates to connecting data terminal equipments having a particular interface, called a V-series interface, to a basic subscriber access system which supports an increased number of simultaneous multiple circuit switched type communications. The present invention is intended for use with the system disclosed in a related patent application Ser. No. 07/882,784 entitled "System for Providing Simultaneous Multiple Circuit-Switched Type Communications on an ISDN Basic Rate Interface".

BACKGROUND OF THE INVENTION

The integrated services digital network (ISDN) is a general purpose digital network capable of supporting access to a wide range of interconnected services, such as voice, data, facsimile and video. ISDN achieves the support of a large variety of services by providing a standard digital network user interface. A standardized interface, including different configurations was disclosed in the I.400 series of recommendations by the CCITT in 1984.

FIG. 1 depicts a standard user network comprising a public network circuit 10 (e.g., a central office switch or PABX) and a network termination unit (NT) 11 which terminates a trunk line (digital subscriber bus) 13 from the public network circuit 10. A plurality of terminal equipments (TEs) 21, 22, 23, 24, 25, 26, 27, 28 are connected via a basic rate S interface bus 12 in a point to multipoint configuration which supports two way communication between the NT 11 and the individual TEs 21, 22,. . . , 28. Three data terminal equipments (DTEs) 31, 32, 33 are connected to the TEs 21, 22, 23, respectively.

According to the CCITT I.400 recommendations, the basic rate interface provides two full-duplex 64 kbit/sec channels (called B-channels) for communication and a D-channel for signaling. Data transmitted in the B-channels is transmitted over the S interface bus 12 as a bitstream organized into groups of eight bits (octets). In a standard user network with a basic rate interface, only one DTE may use a B-channel at one time. Thus, only two DTEs may obtain ISDN data service concurrently.

Illustratively, the DTEs 31, 32, 33 have standard interfaces, called V-series type interfaces. The DTEs 31, 32, 33 may be connected to the ISDN network via the TEs 21, 22, 23 according to the V.110 series of recommendations by the CCITT. As per these recommendations, the TEs 21, 22, 23 provide several functions for connecting such DTEs to the ISDN network including adapting the rate, in which data is transmitted from the DTE 31, 32 or 33, to the ISDN B-channel data rate. The V.110 recommendations include data rate adaption protocols for both synchronously transmitted data and asynchronously transmitted data. Each is now described separately in detail.

1. Synchronous data rate adaption

The data rate adaption performed within each TE 21, 22, 23 according to the V.110 recommendations is illustrated by the functional blocks shown in FIG. 2. As depicted, data transmitted at a user data rate from the DTE (e.g., the DTE 31) is received in the block RA1. In the block RA1, the rate of the data received from the DTE (e.g., the DTE 31) is converted to an intermediate data rate $2^k \cdot 8$ kbits/sec where $k=0$, 1 or 2 depending on the user data rate at which the DTE transmits the data. Table 1 lists a selection of V-series interface data rates up to 19,200 bits/sec and the corresponding intermediate data rate used in the block RA1.

TABLE 1

| Data signalling rate | Intermediate rate |
|---|---|
| 600 | 8 kbits/sec |
| 1200 | 8 kbits/sec |
| 2400 | 8 kbits/sec |
| 4800 | 8 kbits/sec |
| 7200 | 16 kbits/sec |
| 9600 | 16 kbits/sec |
| 12000 | 32 kbits/sec |
| 14400 | 32 kbits/sec |
| 19200 | 32 kbits/sec |

The data is outputted from the block RA1 within a bitstream which is organized into frames. A template frame structure used in converting a user data rate to an intermediate data rate in the block RA1 is illustrated as a two-dimensional array in table 2.

TABLE 2

| Octet No. | Bit Number | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

As shown, an 80 bit template frame (having 10 octets of bits) is used. The block RA1 transmits the bits of the frame in the order from left to right and from the top to the bottom. In the template frame, the octet 0 of the frame contains all 'binary 0' bits. The octet 5 contains a 'binary 1' followed by seven E bits $E_1-E_7$. The octets 1-4 and 6-9 contain a 'binary 1' in the first bit position of the octet, a status bit (S or X bit) in the eighth bit position and six data bits (D bits) in the second through the seventh bit positions. Tables 3a, 3b, 3c, 3d, 3e and 3f illustrate how the data bits outputted from a DTE (e.g., the DTE 31) are assigned to bit positions of the template frame in adapting each of the V-series user data rates of table 1 to a corresponding intermediate data rate.

TABLE 3a

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | D1 | D1 | D1 | D1 | D1 | D1 | S1 |
| 2 | 1 | D1 | D1 | D2 | D2 | D2 | D2 | X |
| 3 | 1 | D2 | D2 | D2 | D2 | D3 | D3 | S3 |
| 4 | 1 | D3 | D3 | D3 | D3 | D3 | D3 | S4 |
| 5 | 1 | 1 | 0 | 0 | E4 | E5 | E6 | E7 |
| 6 | 1 | D4 | D4 | D4 | D4 | D4 | D4 | S6 |
| 7 | 1 | D4 | D4 | D5 | D5 | D5 | D5 | X |
| 8 | 1 | D5 | D5 | D5 | D5 | D6 | D6 | S8 |
| 9 | 1 | D6 | D6 | D6 | D6 | D6 | D6 | S9 |

TABLE 3b

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | D1 | D1 | D1 | D1 | D2 | D2 | S1 |
| 2 | 1 | D2 | D2 | D3 | D3 | D3 | D3 | X |
| 3 | 1 | D4 | D4 | D4 | D4 | D5 | D5 | S3 |
| 4 | 1 | D5 | D5 | D6 | D6 | D6 | D6 | S4 |
| 5 | 1 | 0 | 1 | 0 | E4 | E5 | E6 | E7 |
| 6 | 1 | D7 | D7 | D7 | D7 | D8 | D8 | S6 |
| 7 | 1 | D8 | D8 | D9 | D9 | D9 | D9 | X |
| 8 | 1 | D10 | D10 | D10 | D10 | D11 | D11 | S8 |
| 9 | 1 | D11 | D11 | D12 | D12 | D12 | D12 | S9 |

TABLE 3c

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | D1 | D1 | D2 | D2 | D3 | D3 | S1 |
| 2 | 1 | D4 | D4 | D5 | D5 | D6 | D6 | X |
| 3 | 1 | D7 | D7 | D8 | D8 | D9 | D9 | S3 |
| 4 | 1 | D10 | D10 | D11 | D11 | D12 | D12 | S4 |
| 5 | 1 | 1 | 1 | 0 | E4 | E5 | E6 | E7 |
| 6 | 1 | D13 | D13 | D14 | D14 | D15 | D15 | S6 |
| 7 | 1 | D16 | D16 | D17 | D17 | D18 | D18 | X |
| 8 | 1 | D19 | D19 | D20 | D20 | D21 | D21 | S8 |
| 9 | 1 | D22 | D22 | D23 | D23 | D24 | D24 | S9 |

TABLE 3d

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | F | F | X |
| 3 | 1 | D11 | D12 | F | F | D13 | D14 | S3 |
| 4 | 1 | F | F | D15 | D16 | D17 | D18 | S4 |
| 5 | 1 | 1 | 0 | 1 | E4 | E5 | E6 | E7 |
| 6 | 1 | D19 | D20 | D21 | D22 | D23 | D24 | S6 |
| 7 | 1 | D25 | D26 | D27 | D28 | F | F | X |
| 8 | 1 | D29 | D30 | F | F | D31 | D32 | S8 |
| 9 | 1 | F | F | D33 | D34 | D35 | D36 | S9 |

TABLE 3e

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | 0 | 1 | 1 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

TABLE 3f

|   | 1 | 2 | 3 | 4 | 5 | 6 | 7 | 8 |
|---|---|---|---|---|---|---|---|---|
| 0 | 0 | 0 | 0 | 0 | 0 | 0 | 0 | 0 |

TABLE 3f-continued

|   | 1 | 2 | 3 | 4 | 5 | 6 | 7 | 8 |
|---|---|---|---|---|---|---|---|---|
| 1 | 1 | D1 | D2 | D3 | D4 | D5 | D6 | S1 |
| 2 | 1 | D7 | D8 | D9 | D10 | F | F | X |
| 3 | 1 | D11 | D12 | F | F | D13 | D14 | S3 |
| 4 | 1 | F | F | D15 | F | F | F | S4 |
| 5 | 1 | 0 | 0 | 1 | E4 | E5 | E6 | E7 |
| 6 | 1 | D16 | D17 | D18 | D19 | D20 | D21 | S6 |
| 7 | 1 | D22 | D23 | D24 | D25 | F | F | X |
| 8 | 1 | D26 | D27 | F | F | D28 | D29 | S8 |
| 9 | 1 | F | F | D30 | F | F | F | S9 |

The 48 and 56 kbit/sec V-series user data rates are adapted to the 64 kbit/sec B-channel rate in a single step by assigning bits as shown in tables 3g and 3h (or 3i), respectively.

TABLE 3g

| Octet | Bit Number | | | | | | | |
|---|---|---|---|---|---|---|---|---|
| No. | 1 | 2 | 3 | 4 | 5 | 6 | 7 | 8 |
| 1 | 1 | D1 | D2 | D3 | D4 | D5 | D6 | S1 |
| 2 | 0 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |

TABLE 3h

| Octet | Bit Number | | | | | | | |
|---|---|---|---|---|---|---|---|---|
| No. | 1 | 2 | 3 | 4 | 5 | 6 | 7 | 8 |
| 1 | D1 | D2 | D3 | D4 | D5 | D6 | D7 | 1 |
| 2 | D8 | D9 | D10 | D11 | D12 | D13 | D14 | 1 |
| 3 | D15 | D16 | D17 | D18 | D19 | D20 | D21 | 1 |
| 4 | D22 | D23 | D24 | D25 | D26 | D27 | D28 | 1 |
| 5 | D29 | D30 | D31 | D32 | D33 | D34 | D35 | 1 |
| 6 | D36 | D37 | D38 | D39 | D40 | D41 | D42 | 1 |
| 7 | D43 | D44 | D45 | D46 | D47 | D48 | D49 | 1 |
| 8 | D50 | D51 | D52 | D53 | D54 | D55 | D56 | 1 |

TABLE 3i

| Octet | Bit Number | | | | | | | |
|---|---|---|---|---|---|---|---|---|
| No. | 1 | 2 | 3 | 4 | 5 | 6 | 7 | 8 |
| 1 | D1 | D2 | D3 | D4 | D5 | D6 | D7 | 0 |
| 2 | D8 | D9 | D10 | D11 | D12 | D13 | D14 | X |
| 3 | D15 | D16 | D17 | D18 | D19 | D20 | D21 | S3 |
| 4 | D22 | D23 | D24 | D25 | D26 | D27 | D28 | S4 |
| 5 | D29 | D30 | D31 | D32 | D33 | D34 | D35 | 1 |
| 6 | D36 | D37 | D38 | D39 | D40 | D41 | D42 | 1 |
| 7 | D43 | D44 | D45 | D46 | D47 | D48 | D49 | 1 |
| 8 | D50 | D51 | D52 | D53 | D54 | D55 | D56 | 1 |

As shown, the bit assignments in tables 3g, 3h and 3i use a different template frame from the template frame shown in table 2.

The 600, 1200 and 2400 bit/sec user data rates are adapted to the 8 kbit/sec intermediate data rate by assigning bits as shown in tables 3a, 3b and 3c, respectively. For example, suppose the DTE 31 transmits data, e.g., 12 data bits d1,d2, . . . d12, at a 1200 bit/sec user data rate to the TE 21. The block RA1 assigns the received data bits d1–d12 to the bit positions D1–D12 of table 3b, respectively. In other words, the received bit d1 is inserted into bit positions 2–5 of octet 1, the received bit d2 is inserted into bit positions 6–7 of octet 1 and bit positions 2–3 of octet 2, etc. In addition, the bits '0,' '1' and '0' are inserted into the bit positions 2, 3, and 4, respectively of octet 5, which bit positions correspond to the E bits, E1, E2 and E3. The bits of the frame are then transmitted in the order from left to right and from top to bottom to the block RA2 at the intermediate data rate of 8 kbit/sec.

The 7200 and 14400 bit/sec user data rates are adapted to the 16 and 32 kbit/sec intermediate data rates, respectively, by assigning bits as shown in table 3d. As depicted in table 3d, a filling bit (F bit) is inserted into unused data bit locations of the template frame. The 4800, 9600 and 19,200 bit/sec user data rates are adapted to the 8, 16 and 32 kbit/sec intermediate data rates, respectively, by assigning bits as shown in table 3e. The 12000 bit/sec user data rate is adapted to the 32 kbit/sec intermediate data rate by assigning bits as shown in the table 3f. Again, a filling bit (F bit) is inserted into unused data bit locations of the template frame.

The converted data is then transferred at the intermediate data rate ($2^k \cdot 8$ kbits/sec) from the block RA1 to the block RA2. In the block RA2, the intermediate data rate ($2^k \cdot 8$ kbits/sec) is converted to the B-channel data rate (64 kbits/sec). (If the user data rate is 48 or 56 kbits/sec, the data rate is converted directly to the B-channel data rate in one step.) The block RA2 adapts the data rate of the bitstream outputted from the block RA1 to the B-channel data rate using a bit stuffing technique. To that end, the block RA2 outputs a bitstream which is organized into octets having a particular number of data bit positions containing bits of the received frames. The number of data bit positions depends on the intermediate data rate of the bitstream outputted from the block RA1. FIG. 3 depicts three different template octets used for adapting the 8, 16 and 32 kbit/sec intermediate data rates, respectively, to the B-channel data rate (64 kbits/sec). The order of transmission of the bits of the octets from the block RA2 is from left to right.

As depicted, each template has one or more data bit positions (b bits) into which the bits of the frames outputted from the block RA1 are inserted as they are received. For example, as bits of the frames are received at the 8 kbit/sec intermediate rate, they are inserted, in the order in which they are received, in the first bit position $b_1$ of sequentially transmitted octets. As bits of the frames are received at the 16 kbit/sec intermediate rate, they are inserted, in the order in which they are received, into the first two bit positions $b_1$, $b_2$ of successive octets transmitted from the block RA2. Similarly, as bits of the frames are received at the 32 kbit/sec intermediate data rate, they are inserted, in the order in which they are received, into the first four bit positions $b_1$, $b_2$, $b_3$, $b_4$ of successive octets transmitted from the block RA2. All of the remaining bit positions of each template octet are filled with a default binary value such as 'binary 1'.

Data adapted to the B-channel data rate in this manner is then transmitted from the TE (e.g., the TE 21) to the S interface bus 12. The data propagates via the NT 11 to a receiving TE which TE has conventional circuitry for reversing the above described data rate adaptions. Illustratively, the same blocks RA1 and RA2 are capable of performing the reverse data rate adaption for received data. That is, the block RA2 receives a bitstream from the B-channel at the B-channel data rate and outputs a second bitstream at an appropriate intermediate data rate (depending on the user data rate) comprising only information bits contained within the data bit positions of each received octet. The block RA1 receives the second bitstream at the intermediate data rate from the block RA2 and outputs a third bitstream containing the user data therein at a user data rate to the DTE.

2. Asynchronous data rate adaption

FIG. 4 illustrates the data rate adaption within a TE (e.g., the TE 21) which receives asynchronously transmitted data from a DTE (e.g., the DTE 31). As depicted, the data rate adaption is achieved using three functional blocks RA0, RA1 and RA2. The block RA0 performs asynchronous to synchronous conversion according to the CCITT series V.14 recommendations. This conversion protocol is summarized in table 4.

TABLE 4

| Data rate (bit/s) | Rate tolerance (%) | No. of data units | No. of stop elements | RA0/RA1 rate (bit/s) | RA1 rate (kbit/s) |
|---|---|---|---|---|---|
| 50 | ±2.5 | 5 | 1.5 | 600 | 8 |
| 75 | ±2.5 | 5.7 or 8 | 1:1,5:2 | 600 | 8 |
| 110 | ±2.5 | 7 or 8 | 1 or 2 | 600 | 8 |
| 150 | ±2.5 | 7 or 8 | 1 or 2 | 600 | 8 |
| 200 | ±2.5 | 7 or 8 | 1 or 2 | 600 | 8 |
| 300 | ±2.5 | 7 or 8 | 1 or 2 | 600 | 8 |
| 600 | +1 −2.5 | 7 or 8 | 1 or 2 | 600 | 8 |
| 1,200 | +1 −2.5 | 7 or 8 | 1 or 2 | 600 | 8 |
| 2,400 | +1 −2.5 | 7 or 8 | 1 or 2 | 1,200 | 8 |
| 3,600 | +1 −2.5 | 7 or 8 | 1 or 2 | 2,400 | 8 |
| 4,800 | +1 −2.5 | 7 or 8 | 1 or 2 | 4,800 | 8 |
| 7,200 | +1 −2.5 | 7 or 8 | 1 or 2 | 9,600 | 16 |
| 9,600 | +1 −2.5 | 7 or 8 | 1 or 2 | 9,600 | 16 |
| 12,000 | +1 −2.5 | 7 or 8 | 1 or 2 | 19,200 | 32 |
| 14,400 | +1 −2.5 | 7 or 8 | 1 or 2 | 19,200 | 32 |
| 19,200 | +1 −2.5 | 7 or 8 | 1 or 2 | 19,200 | 32 |

As depicted in table 4, the block RA0 produces a synchronous bitstream at a data rate of $2^n \cdot 600$ bits/sec, where n=0, 1, 2, 4, 8, 16 or 32 depending on the user data rate. The blocks RA1 and RA2 are the same as described above for synchronous data transmission. Thus, the block RA1 adapts the synchronous bitstream outputted from the block RA0 to an intermediate data rate ($2^k \cdot 8$ kbit/sec) and the block RA2 adapts the intermediate data rate bitstream outputted from the block RA1 for transmission at the B-channel data rate (64 kbit/sec). Again, the data is transmitted to a receiving TE (via the NT 11) which has circuitry for reversing each of the three aforementioned data rate adaptions. For example, each of the blocks RA0, RA1 and RA2 additionally performs the inverse of the respective data rate adaptions described above on data received from the NT 11.

The aforementioned data rate adaption protocol is suited for the ISDN network shown in FIG. 1. However, the network of FIG. 1 is disadvantageous as only two DTEs may obtain ISDN service simultaneously.

FIG. 5 illustrates another communications network in which more than two DTEs may obtain ISDN service simultaneously on an ISDN basic rate interface. Such a network is disclosed in the above listed U.S. patent application Ser. No. 07/882,784.

A public network circuit 113 (e.g., a central office switch or PABX) is connected via a trunk line (digital subscriber line) 110 to a fractional network termination unit (F-NT) 111. A F-NT is a NT which is also capable of providing full duplex ISDN services to more than two specially adapted TEs, called fractional terminal equipments (F-TEs), simultaneously. This is achieved using a time division multiplexing scheme in which each B-channel is divided into a number of subchannels which subchannels are subsequently allocated to the F-TEs as needed. For example, each B-channel may be divided into N subchannels, where N is an integer.

The two B-channels, referred to as the B1 and B2 channels are combined into a bitstream, having a frame structure as depicted in FIG. 5A, which is transmitted on the S-interface bus. As shown, a standard S/T interface frame structure includes four alternate octets of B1 and B2-channel bits and control bits. To provide N subchannels, each of the standard whole frames is divided into two parts, each referred to as a subframe. Each subframe includes one octet of B1 bits and one octet of B2 bits. The subframes, in turn, are organized into sequential groups of N subframes called multiframes. Illustratively, each multiframe provides a reference for allocating the octets of the subframes to subchannels.

FIG. 5B is a diagram representative of a multiframe structure comprising N subframes where N is a nonnegative integer. Each subframe comprises three blocks denoted as B1$i$, B2$i$ and other wherein i is an integer index between 1 and N. Block B1$i$ and block B2$i$ each represents an octet of B1-channel bits and an octet of B2-channel bits, respectively, and the other bits are simply represented by the block "Other". The bit sequence in each subframe (not shown in FIG. 5B) conforms to the definition in the foregoing description of FIGS. 5A.

As illustrated in FIG. 5B, each of the multiframe structures comprises N octets of B1-channel bits, each octet denoted as B11, B12, . . . , B1N, respectively, and N octets of B2-channel bits, each octet denoted as B21, B22, . . . , B2N, respectively. In view of the aforementioned multiframe structures, the B1-channel may be divided into N lower rate subchannels, denoted as B11, B12, . . . , B1N, each of which comprises one octet per multiframe. The B2-channel may also be divided into N sub B2-channels denoted as B21, B22, . . . , B2N, each of which comprises one octet per multiframe. Since the bandwidth of each B-channel on the S interface bus is 64 kHz, each sub B-channel, B1$i$ or B2$i$, occupies the bandwidth of 64/N kbps.

A plurality of F-TEs 121, 122, 123 and TEs 124, 125 are connected via the S interface bus 112 to the F-NT 111. The F-TEs 121, 122 and 123 are capable of transmitting and receiving data via a subchannel at a 64/N kbit/sec data rate where N is an integer equal to the number of subchannels per B-channel. The TEs 124, 125 can only transmit data at the B-channel data rate of 64 kbits/sec. Three DTEs 181, 182, 183 are connected to the F-TEs 121, 122 and 123, respectively according to the V-series recommendations.

The aforementioned V.110 data rate adaption protocol cannot properly adapt the data rate of the F-TEs 121, 122 and 123. This is because the V.110 protocol adapts the user data rate of the DTEs to the B-channel data rate of 64 kbits/sec. This B-channel data rate is too fast for use by the F-TEs in communicating over subchannels at a slower 64/N kbits/sec data rate (so that more than two DTEs may obtain simultaneous ISDN services on the network).

It is therefore an object of the present invention to provide for adapting the data rate of DTEs which are connected, according to V-series recommendations, via a F-TE to an ISDN basic rate interface which provides ISDN services to more than two DTEs simultaneously. Additionally, it is an object of the present invention to provide a rate adapter which perform this function and which is transparent to conventional DTEs, F-TEs and NTs. It is a further object of the present invention to provide for V-series data rate adaption using a minimum effort.

SUMMARY OF THE INVENTION

These and other objects are achieved by the present invention which provides a system and method for adapting the data rate of data communicated to and from a data terminal equipment with a V-series type interface. A fractional terminal equipment may be provided according to the present invention for connecting a data terminal equipment to a fractional network termination unit which supports more than two simultaneous communications at a subchannel data rate. The fractional terminal equipment is provided with a V.110 rate adapter which is connected to the data terminal equipment. The data terminal equipment transmits user data to the V.110 rate adapter at a user data rate. The V.110 rate adapter, in turn, outputs a first bitstream which includes the user data, at the B-channel data rate. A fractional rate adapter is also provided which receives the first bitstream at the B-channel data rate and outputs, at the subchannel data rate, a second bitstream, which includes the bits of the first bitstream, to the fractional network termination unit.

Thus, a conventional V.110 rate adapter may illustratively be modified according to the present invention by simply adding one additional rate adapter block.

BRIEF DESCRIPTION OF THE DRAWINGS

FIG. 2 illustrates a V.110 rate adapter for adapting the data rate of synchronously transmitted data.

FIG. 3 depicts three template octet structures utilized in adapting the data rate in the adapter depicted in FIG. 2.

FIG. 4 illustrates a V.110 rate adapter for adapting the data rate of asynchronously transmitted data.

FIG. 5A depicts a standard frame format used for transmitting over a conventional S interface bus.

FIG. 5B shows a multiframe format used for dividing each B-channel into subchannels.

DETAILED DESCRIPTION OF THE INVENTION

Referring again to FIG. 5, the F-TEs 121, 122 and 123 connect the DTEs 181, 182 and 183 to the F-NT 111 via the S interface bus 112. The F-TEs 121, 122 and 123 provided according to the present invention connect the DTEs 181, 182 and 183 so that more than two DTEs, having V-series interfaces, may obtain ISDN service simultaneously.

Figure 6:
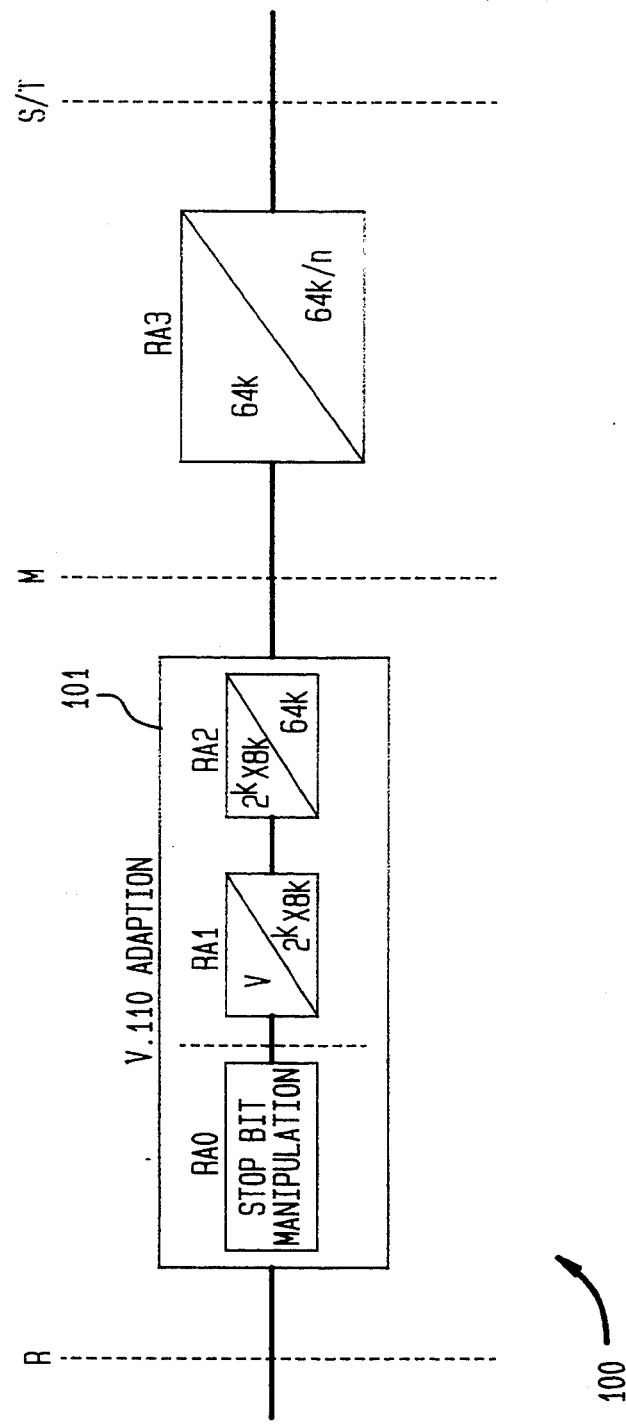
FIG. 6 depicts a rate adapter according to the present invention.

The F-TEs 121, 122 and 123 of the present invention have rate adapter circuits such as depicted in FIG. 6. As depicted, the rate adapter 100 has a V.110 rate adapter 101 with circuits RA0, RA1 and RA2. Each of these circuits functions in a manner similar to as described above. Thus, a DTE inputs data at a user data rate to the V.110 adapter 101. If the data is transmitted asynchronously, it is first converted to a synchronous bitstream in the rate adapter RA0. The rate adapter RA1 receives this synchronous bitstream at a user data rate and outputs a second bitstream at an intermediate data rate ($2^k \cdot 8$ kbits/sec). The rate adapter RA2 receives the second bitstream at the intermediate data rate ($2^k \cdot 8$ bits/sec) and outputs a third bitstream at the B-channel data rate (64 kbits/sec). Furthermore, data may be received at the B-channel data rate (64 kbits/sec) in the circuit RA2 and outputted at the user data rate synchronously from the circuit RA1 or asynchronously from the circuit RA0 (whichever the case may be).

Figure 6A:
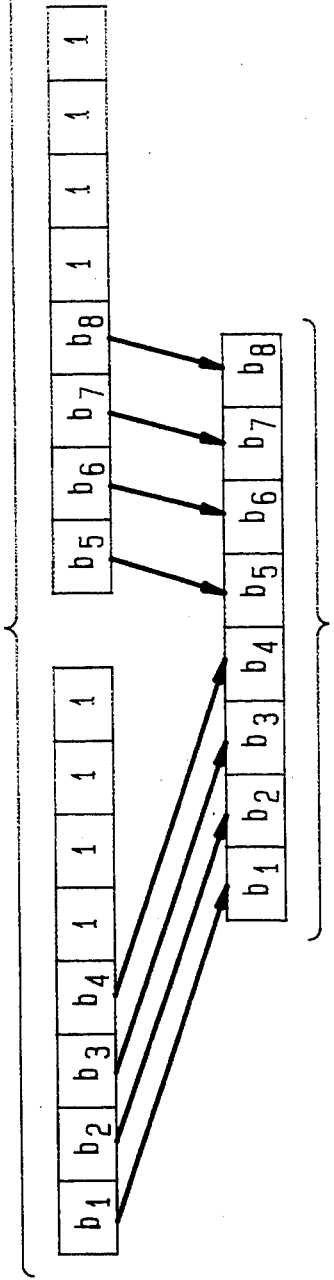
FIG. 6A illustrates a bit discarding technique used by the rate adapter of FIG. 6.

As depicted, a rate adapter circuit RA3, called a fractional rate adapter, is added to each F-TE 121, 122 and 123 via an M interface. The fractional rate adapter RA3 adapts the data rate of the data outputted from the V.110 rate adapter 101 to the subchannel data rate (64/N kbits/sec). As described above, the circuit RA2 utilizes a bit stuffing technique in adapting the data rate to the B-channel data rate. Thus, the V.110 rate adapter 101 outputs a bitstream organized into octets, which octets have only a predetermined number of data bit positions which contain bits of information. As such, the fractional rate adapter RA3 uses a bit discarding technique, as illustrated in FIG. 6A, to convert the data rate of the bitstream outputted from the V.110 rate adapter 101 to the subchannel data rate ($2^k \cdot 8$ kbits/sec). The fractional rate adapter RA3 outputs, at the lower subchannel data rate (64/N kbits/sec), a bitstream organized into octets which contain only the bits of information contained within data bit positions of octets of the received bitstream. The bit stuffing 'binary 1' bits are discarded. For example, suppose that the DTE 181 outputs data at the user rate of 19,200 bits/sec and that each B-channel has two subchannels (i.e., N=2 and the data rate of each subchannel is 64/N kbits/sec or 32 kbits/sec). For every eight bits received from the circuit RA1, the rate adapter RA2 outputs two octets having four data bit positions which contain the received bits. For instance, if the bits $b_1$, $b_2$, $b_3$, $b_4$, $b_5$, $b_6$, $b_7$ and $b_8$ are received from the rate adapter RA1, the rate adapter RA2 outputs two octets of bits $b_1b_2b_3b_41111$ at 64 kbits/sec. As depicted in FIG. 6A, the rate adapter RA3 receives these two octets $b_1b_2b_3b_41111$ $b_5b_6b_7b_81111$ and concatenates the information bits contained in the data bit positions of each octet $b_1$, $b_2$, $b_3$, $b_4$, $b_5$, $b_6$, $b_7$ and $b_8$ by and $b_8$ to form a single octet having only information bits $b_1b_2b_3b_4b_5b_6b_7b_8$. This octet is then transmitted on an allocated subchannel at 32 kbits/sec to the F-NT 111.

Figure 6B:
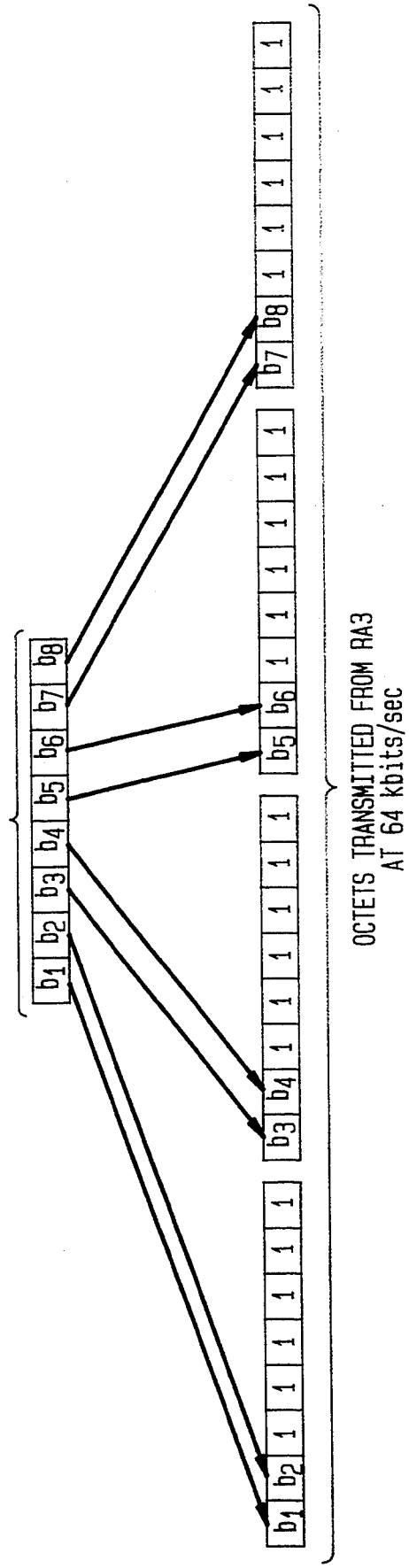
FIG. 6B illustrates a bit stuffing technique used by the rate adapter of FIG. 6.

In addition to the above described rate adaption, the fractional rate adapter circuit RA3 is capable of performing the inverse rate adaption to data received from the S interface bus 112 using a bit stuffing technique, as depicted in FIG. 6B. For example, suppose that the user data rate of data transmitted to and from a DTE is 9600 bits/sec and that a bitstream is received from a subchannel at a 16 kbit/sec subchannel data rate (i.e., N=4). For each received octet, the fractional rate adapter circuit RA3 outputs four octets of bits at the B-channel rate according to the V.110 protocol (see FIG. 3). That is, if the fractional rate adapter circuit RA3 receives the octet $b_1b_2b_3b_4b_5b_6b_7b_8$, a bitstream containing the octets $b_1b_2111111$, $b_3b_4111111$, $b_5b_6111111$ and $b_7b_8111111$ is outputted to the V.110 rate adapter 101 at the B-channel data rate (64 kbits/sec), as depicted in FIG. 6B. The V.110 rate adapter 101, in turn, outputs the user data to the DTE via the R interface at 9600 bits/sec.

It is advantageous to add a fractional rate adapter RA3 rather than to eliminate the rate adapter RA2. The reason is that integrated circuits having the construction of the V.110 adapter 101, such as the SIEMENS ITAC PSB 2110, are readily available on the market. Thus, it is not necessary to design an entire substitute V.110 rate adapter to support more than two simultaneous communications on an ISDN basic rate interface. By simply adding the fractional rate adapter circuit RA3 to conventional rate adaption circuits, the DTE may be connected to such a network and be able to receive ISDN services with more than one other DTE simultaneously.

Figure 1:
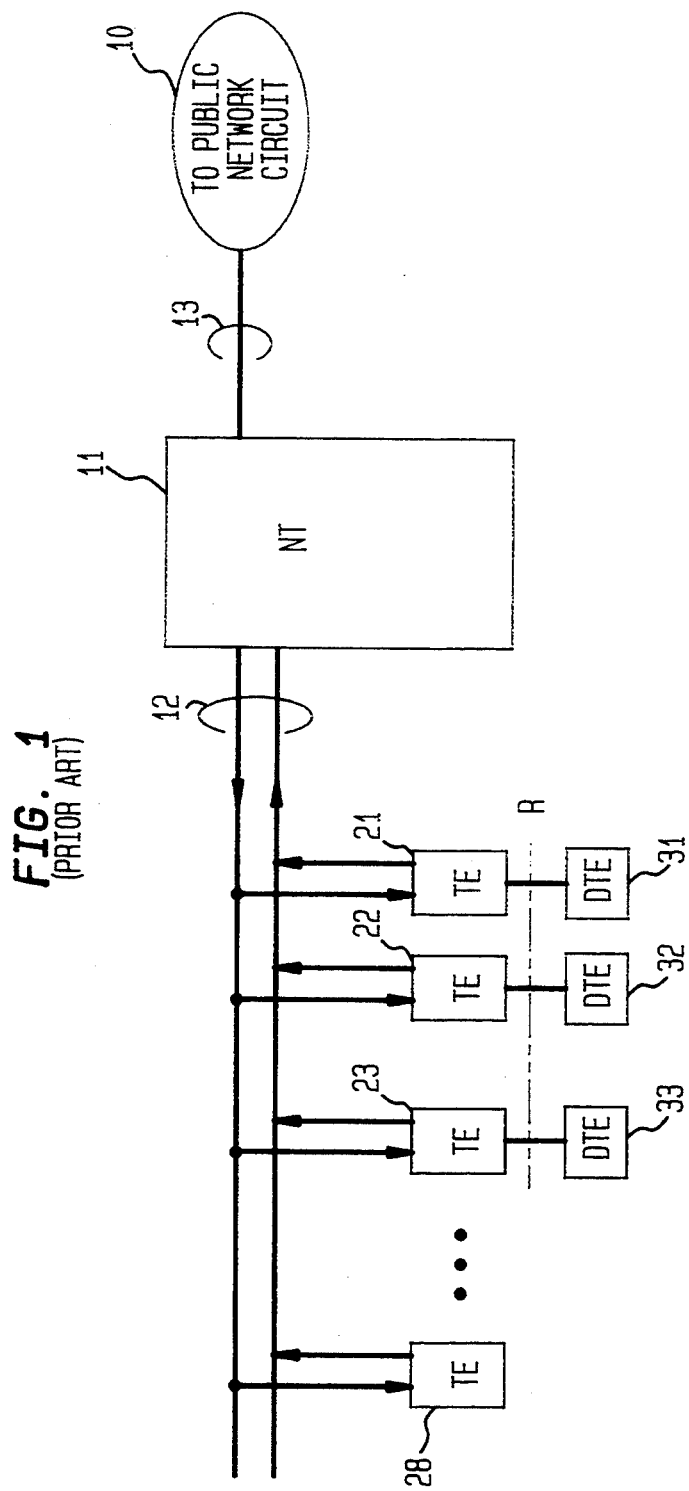
FIG. 1 depicts a standard user ISDN network.
Figure 5:
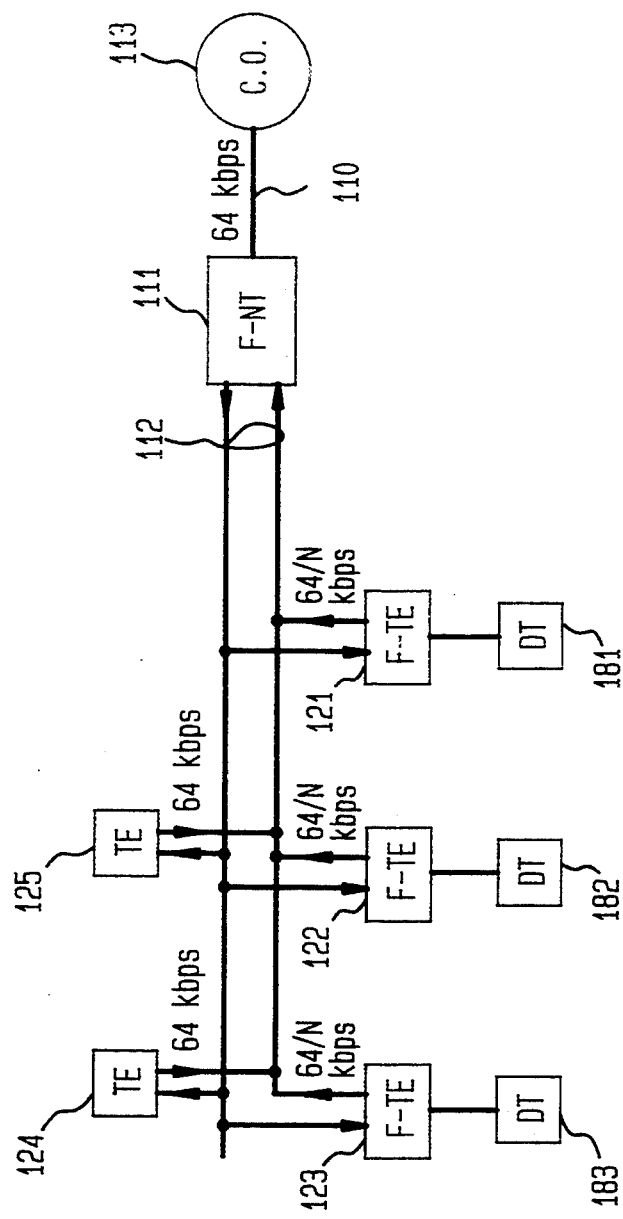
FIG. 5 depicts a user ISDN network which supports more than two simultaneous multiple circuit switched type communications.
Figure 7:
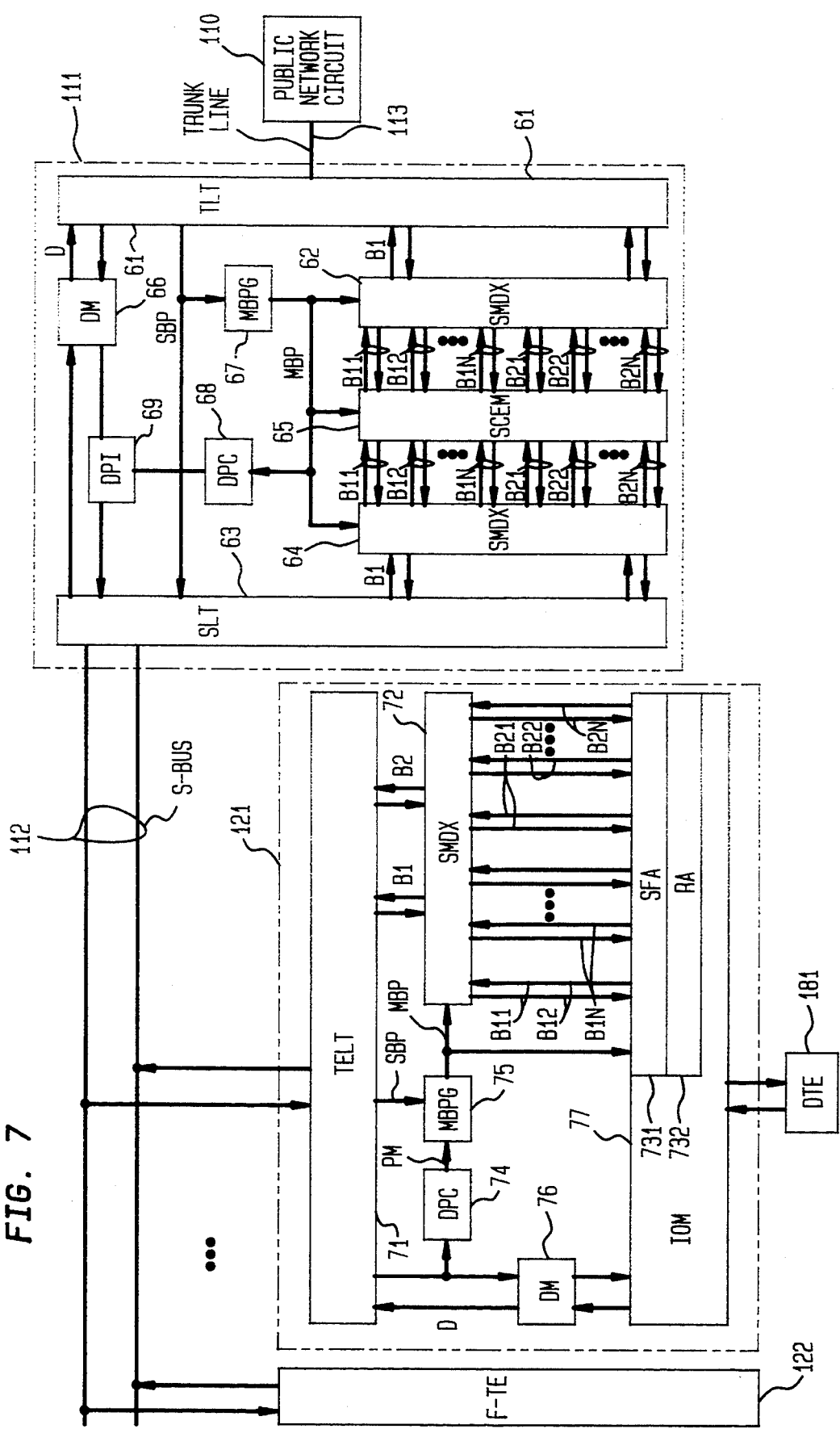
FIG. 7 depicts the system of FIG. 5 adapted according to the present invention.

Turning now to FIG. 7, the system of FIG. 5 is shown in greater detail. In the F-NT block 111, a well-known trunk line termination circuit (TLT) 61, e.g., SIEMENS PEB2081, demultiplexes a signal transmitted from the public network circuit 110 into discrete channels B1, B2 and a signalling channel called a D-channel and multiplexes each channel B1, B2 and D into a signal for transmission to the public network circuit 110. A well-known S-bus line termination circuit (SLT) 63, e.g., SIEMENS PEB2081, which terminates the S-bus 112, demultiplexes a signal transmitted from the F-TEs 121, 122, 123 and TEs 124, 125 on the S-bus line 112 into the channels B1, B2 and D, and multiplexes the channels B1, B2 and D into a signal for transmission to the F-TEs 121, 122, 123 and TEs 124, 125 on the S-bus line 112. The TLT 61 also extracts subframe boundary clock pulses (SBPs) from the signals on the trunk line 113 and inputs these SBPs to the SLT 63.

The subframe boundary pulses are also inputted to a multiframe boundary pulse generator (MBPG) 67 to generate a multiframe boundary pulse (MBP) every N subframe boundary pulses, where N is a non-negative integer. Illustratively, the MBP is used to synchronize transmission in the subchannels. The MBPG 67 may illustratively be implemented using a divide-by-N counter. The multiframe boundary pulses MBPs are then inputted to a subchannel multiplexer-demultiplexer (SMDX) 62 connected to the TLT 61 and a subchannel multiplexer-demultiplexer (SMDX) 64 connected to the SLT 63. Thus, with the MBPs, the SMDX 62 and the SMDX 64 can identify the first subframe in a multiframe and can demultiplex the B1-channel into N sub B1-channels which are denoted as B11, B12, . . . , B1N. Additionally, the B2-channel is demultiplexed into sub B2-channels which are denoted as B21, B22, . . . , B2N. Each sub B-channel (B1$i$ or B2$i$) occupies the bandwidth of 64/N kbps.

Figure 9:
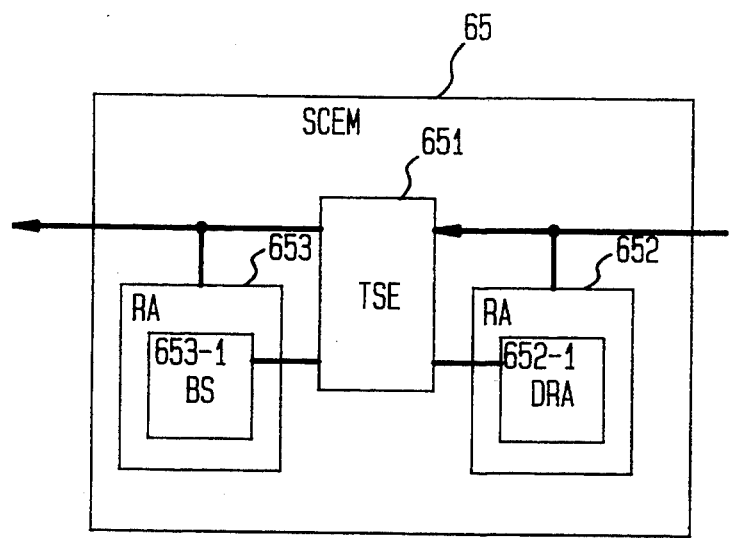
FIG. 9 shows the subchannel exchange and management circuit (SCEM) of a F-NT according to the present invention in greater detail.

A subchannel exchange and management circuit (SCEM) 65 also receives MBPs sent from the MBPG 67. Referring to FIG. 9, the SCEM 65 includes a time slot exchanger 651 for selectively exchanging sub B-channels from the S-bus 112 and the trunk line 113. In this manner, local inter-TE communication is established and some TEs or F-TEs may receive information from, or transmit information to, the trunk line 113. Connections, i.e., the exchange of information between subchannels of local and/or external network elements which receive or transmit information, are established according to calls by external elements or requests by local F-TEs 121, 122, 123 and TEs 124, 125.

A TE line termination unit (TELT) 71 in each of the F-TEs 121, 122, 123 terminates the S-bus 112. The TELT 71 demultiplexes a signal transmitted on the S-bus 112 from the F-NT 111 into the channels B1, B2 and D and multiplexes channels B1, B2 and D into a multiplexed signal on the S-bus 112 for transmission to the F-NT 111. The TELT 71 functions similarly to TLT 61 and SLT 63 in the F-NT 111 and illustratively may also be a SIEMENS PEB2081 circuit. Each F-TE 121, 122, 123 also comprises a multiframe boundary pulse generator (MBPG) 75 which receives SBPs extracted by the TELT 71 and generates a multiframe boundary pulse (MBP) every N SBPs. This MBP is used for identifying the boundary of a multiframe structure within the F-TE (e.g., the F-TE 121). The MBP is sent to the sub B-channel multiplexer-demultiplexer (SMDX) 72 which demultiplexes the B1 and B2-channels into 2N sub B-channels denoted as B11, B12, . . . , B1N, and B21, B22, . . . , B2N.

Both the F-NT 111 and each F-TE 121, 122, 123 have a D-channel management circuit (DM) 66 or 76 for transferring D-channel information including call transactions to make a connection link, etc. In addition, a D-pattern generator circuit (DPG) 68 is provided for generating a signal for synchronizing subchannel communication between the F-NT 111 and the F-TEs 121, 122, 123. The generated signal is inserted into the D-channel by a D-pattern insertion circuit (DPI) 69. The pattern propagates to each F-TE 121, 122, 123 via the S-bus 112 where it is received by a D-pattern check circuit (DPC) 74. The DPC 74 may, in response to the received pattern, transmit a pattern matching signal to the MBPG 75 in order to synchronize the MBP outputted therefrom with the MBP outputted from the MBPG 67.

Figure 8:
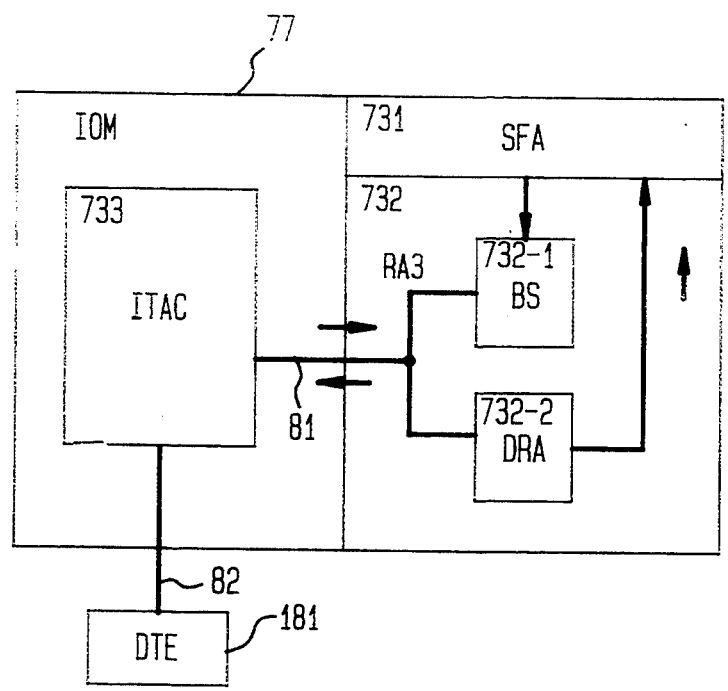
FIG. 8 shows the input output management circuit (IOM) of an F-TE according to the present invention in greater detail.

Each F-TE 121, 122, 123 further includes an Input-/Output Management circuit (IOM) 77 for controlling the DTE 181, 182, 183 connected to that particular F-TE 121, 122, 123. The IOM 77 comprises a subchannel fetch/assignment circuit (SFA) 731 which receives MBPs for sequencing the reception and transmission of information on allocated sub B-channels. Illustratively, the rate adaption circuit 100 (FIG. 6) of the F-TE 121 is part of the input/output management circuit (IOM) 77. The IOM 77 is shown in greater detail in FIG. 8. In FIG. 8, a well known ISDN terminal adapter circuit (ITAC) 733, e.g., SIEMENS ITAC PSB 2110, is shown connected to the DTE 181 by the line 81. The ITAC 733 provides an R reference interface for the DTE 181 and both transmits and receives data according to the V.110 protocol (i.e., the ITAC 733 includes a V.110 rate adapter circuit similar to the circuit shown in FIG. 6). The ITAC 733 transmits a bitstream containing the user data from the DTE 181 to the fractional rate adapter RA3 732 through the M interface 81 at the B-channel data rate (64 kbits/sec).

The RA3 732 includes a data rate adaption circuit (DRA) 732-2 which receives the bitstream outputted by the ITAC 733 at the B-channel data rate (64 kbits/sec) (which bitstream contains information bits in data bit positions and a default binary value in other bit positions). The DRA 732-2 outputs a bitstream at a subchannel data rate comprising the information bits of the received bitstream. The subchannel data rate may be selected depending on the intermediate data rate obtained from the ITAC 733 (which, in turn, is based on the user data rate as shown in table 1). The DRA 732-2 transmits the data to the subchannel fetch/assignment circuit (SFA) 731. The SFA 731, in turn, outputs the data to the S interface bus 112 on an allocated subchannel.

The RA3 732 also includes a bit stuffing circuit (BS) 732-1 which receives data from the SFA 731 at the subchannel data rate (64/N kbits/sec). The BS 732-1 adapts the subchannel data rate (64/N kbits/sec) to the B-channel data rate (64 kbits/sec) using the aforementioned bit stuffing technique. The BS 732-1 then transmits a bitstream containing the received data at the B-channel data rate (64 kbits/sec) to the ITAC 733 via the M 81 interface. The ITAC 733 converts the data rate of the bitstream to the user data rate (as discussed above) and transfers the data to the DTE 181 via the R interface 82.

If the F-TE 121 transmits data to another local F-TE connected to the same F-NT 111 (e.g., the F-TE 123), then communication between the DTEs 181 and 183 may be established if each F-TE 121 and 123 is provided with a rate adapter RA3 732. However, if the DTE 181 communicates with a conventional device such as a DTE connected via a conventional TE, or a remote conventional NT (i.e., connected to the F-NT 111 via the public network circuit 110), the F-NT 111 must be provided with fractional rate adaption capabilities. The F-NT 111 must perform the rate adaption of the fractional rate adapter RA3 for data received from the conventional device so that the DTE 181 may receive the data. Furthermore, the F-NT 11 must perform the inverse rate adaption of the fractional rate adapter RA3 for data received from the DTE 181 so that the conventional device may receive the data. The rate adaption of both the F-TE 121 and the F-NT 111 must be performed in a manner which does not disrupt the V.110 protocol, i.e., must be transparent to conventional devices to permit the DTEs 181, 182, 183 to communicate with any type of device.

Referring again to FIG. 9, the rate adaption circuits of the F-NT 111 (FIG. 6) are located within the subchannel exchange and management circuit (SCEM) 65 (FIG. 7). Data transmitted from the F-TE, e.g., the F-TE 121 (FIG. 6), is received in a bit stuffing circuit (BS) 653-1 at the subchannel data rate (64/N kbits/sec) via the subchannel multiplexer demultiplexer (SMDX) 64 (FIG. 7). Using the above-described bit stuffing technique, the BS 653-1 adapts the subchannel data rate (64/N kbits/sec) of the received data to the B-channel data rate (64 kbits/sec). Thereafter, the data is transferred to a time slot exchanger (TSE) 651. The TSE 651 assigns the data to the proper time slots in order to route the data to its appropriate destination. For example, the data may be transmitted out of the network via the trunk line termination circuit (TLT) 61 to a conventional device.

In a similar fashion, data received, for example, from the public network circuit 110 via the TLT 61, is transferred to a DRA 652-1 at the B-channel rate (64 kbits/sec) via the SMDX 62. Using the above-described bit discarding technique, the DRA 652-1 adapts the data rate of the incoming data to the subchannel data rate (64/N kbits/sec). The data is then transferred at the subchannel data rate to the TSE 651. The TSE 651 assigns the data to an appropriate time slot so that it arrives at the correct destination (e.g., so that it is transmitted on a subchannel assigned to the F-TE 121).

The number of subchannels N into which each B-channel is divided (and therefore the subchannel data rate 64/N kbits/sec) may be adjusted depending on the data rate demands of the F-TEs and TEs which require ISDN service. For example, it is desirable to adjust the subchannel data rate to equal the intermediate data rate used in the rate adaption of the ITAC 733 (FIG. 8) located in a communicating F-TE. In such a case, the F-TE may transmit control information (e.g., on the signalling D-channel) specifying the optimal subchannel data rate (e.g., equal to the intermediate data rate used in the ITAC therein) to the F-NT 111 (FIG. 5). The F-NT 111 (FIG. 5) then, if possible, adjusts the number N of subchannels accordingly. In addition, the F-NT may adjust the subchannel data rate according to intermediate data rate information received from a remote conventional NT or TE.

In summary, a simple rate adapter is provided which permits more than two DTEs with V-series interfaces to simultaneously communicate on an ISDN basic rate interface. The rate adapter according to the invention converts the user data rate to the B-channel data rate and the B-channel data rate to a subchannel data rate using a minimum effort. The rate adaption can be performed in a manner which is transparent to conventional devices.

Finally, the aforementioned embodiments are intended to be merely illustrative. Numerous other embodiments may be devised by those having ordinary skill in the art without departing from the spirit and scope of the following claims.

We claim:

1. A fractional terminal equipment, connecting, according to V-series recommendations, a data terminal equipment to a fractional network termination unit capable of communicating on a B-channel at a B-channel data rate and on a subchannel of said B-channel at a subchannel data rate which is less than or equal to said B-channel data rate, said fractional terminal equipment comprising:

a first rate adapter circuit capable of receiving user data from said data terminal equipment at a user data rate, and outputting, at an intermediate data rate, selected depending on said user date rate, a first bitstream, having a particular frame structure and comprising said user data, a second rate adapter circuit, capable of receiving said first bitstream from said first rate adapter circuit and outputting, at said B-channel data rate, a second bitstream organized into octets having a particular number of data bit positions, depending on said intermediate data rate, containing bits of said first bitstream and other bit positions, containing a default binary value, and a fractional rate adapter circuit, capable of receiving said second bitstream and outputting, via said subchannel to said fractional network termination unit at said subchannel data rate, a third bitstream organized into only octets comprising only bits contained in said data bit positions of said second bitstream.

2. The fractional terminal equipment of claim 1 further comprising a third rate adapter circuit connected between said data terminal equipment and said first rate adapter circuit, said third rate adapter circuit being capable of receiving asynchronous user data from said data terminal equipment and outputting synchronous user data to said first rate adapter circuit.

3. The fractional terminal equipment of claim 1 wherein said fractional rate adapter circuit comprises a data rate adapter circuit for generating said third bitstream from said second bitstream by discarding said default binary value bits.

4. The fractional terminal equipment of claim 1 wherein said fractional rate adapter circuit further comprises a bit stuffing circuit capable of receiving a fourth bitstream comprising user data transmitted from said fractional network termination unit via said subchannel at said subchannel data rate and outputting a fifth bitstream to said second rate adapter circuit, at said B-channel data rate, organized into octets having a particular number of data bit positions, depending on said user data rate of said data terminal equipment, containing bits of said fourth bitstream, and other bit positions, containing a default binary value, wherein said second rate adapter circuit outputs a sixth bitstream to said first rate adapter circuit containing only said bits in data bit positions of said fifth bitstream at said intermediate data rate and wherein said first rate adapter circuit outputs a seventh bitstream to said data terminal equipment at said user data rate of said data terminal equipment comprising user data contained in said sixth bitstream.

5. The fractional terminal equipment of claim 1 wherein said subchannel data rate equals 1/N times said B-channel rate, where N is the number of subchannels per b-channel.

6. The fractional terminal equipment of claim 1 further comprising a D-channel management circuit for transmitting a control signal indicating a desired subchannel data rate, depending on said user data rate, to said fractional network termination unit.

7. A fractional network termination unit capable of being connected to a plurality of devices including a public network circuit and at least one data terminal equipment, said at least one data terminal equipment including a first data terminal equipment connected to said fractional network termination unit via a fractional terminal equipment according to V-series recommendations, said fractional network termination unit being capable of communicating on a B channel at a B-channel data rate and on a subchannel of said B-channel at a subchannel data rate which is less than or equal to said B-channel data rate, and comprising:

a data rate adapter circuit, capable of receiving, from a first device of said plurality of devices via said B-channel at said B-channel data rate, a first bitstream, destined to said first data terminal equipment, organized into octets having a particular number of data bit positions, depending on a user data rate of said first data terminal equipment, and other bit positions, containing a default binary value, said data rate adapter circuit also being capable of outputting a second bitstream, to said first data terminal equipment via said subchannel at said subchannel data rate, organized only into octets comprising only bits contained in said data bit positions of said first bitstream, and a bit stuffing circuit, capable of receiving a third bitstream from said first data terminal equipment via said subchannel at said subchannel data rate and outputting, to said first device of said plurality of devices via said B-channel at said B-channel data rate, a fourth bitstream, organized into octets having a particular number of data bit positions, depending on said user data rate of said first data terminal equipment, containing bits of said third bitstream, and other bit positions, containing a default binary value.

8. The fractional network termination unit of claim 7 wherein said fractional network termination unit is capable of adjusting said subchannel data rate depending upon said user data rate of said first data terminal equipment.

9. An ISDN network providing for V-series data terminal equipment communication on a subchannel at a subchannel data rate comprising:
   a fractional network termination unit, capable of simultaneously communicating with a data terminal equipment on a B-channel at a B-channel data rate and a plurality of data terminal equipments on respective subchannels of said B-channel at a subchannel data rate which is less than or equal to said B-channel data rate, and
   at least one fractional terminal equipment connected to said fractional network termination unit via an S interface bus, and also connected to a data terminal equipment, said at least one fractional terminal equipment comprising:
      a first rate adapter stage cooperating with said data terminal equipment so as to receive user data from a terminal equipment at a user data rate, and, in response thereto, to output, an intermediate data rate, selected depending on said user date rate, a first bitstream, having a particular frame structure and comprising said user data,
      a second rate adapter stage, cooperating with said first rate adapter stage so as to receive said first bitstream from said first rate adapter stage and, in response thereto, to output, at said B-channel data rate, a second bitstream organized into octets having a particular number of data bit positions, depending on said intermediate data rate, containing bits of said first bitstream and other bit positions, containing a default binary value, and
      a third rate adapter stage, cooperating with said second rate adapter stage and said fractional network termination unit so as to receive said second bitstream and, in response thereto, to output, to said fractional network termination unit via one of said subchannels at said subchannel data rate, a third bitstream organized into only octets comprising only bits contained in said data bit positions of said second bitstream.

10. A three stage rate adapter for adapting the user data rate, of a data terminal equipment connected, according to V-series recommendations, to a fractional terminal equipment, to the subchannel data rate of an ISDN network which supports communication on a B-channel at a B-channel data rate and on subchannels of said B-channel at a subchannel data rate which is less than or equal to said B-channel data rate, said three stage rate adapter comprising
   a first rate adapter stage cooperating with said data terminal equipment so as to receive user data from said data terminal equipment at a user data rate, and, in response thereto, to output, at an intermediate data rate selected depending on said user data rate, a first bitstream, having a particular frame structure and comprising said user data,
   a second rate adapter stage, cooperating with said first rate adapter stage so as to receive said first bitstream from said first rate adapter stage and, in response thereto, to output, at said B-channel data rate, a second bitstream organized into octets having a particular number of data bit positions, depending on said intermediate data rate, containing bits of said first bitstream, and other bit positions containing a default binary value, and
   a third rate adapter stage, cooperating with said second rate adapter stage, so as to receive said second bitstream and, in response thereto, to output, on said subchannel at said subchannel data rate, a third bitstream organized into only octets comprising only bits contained in said data bit positions of said second bitstream.

11. A process for adapting the data rate of a V-series data terminal equipment in an ISDN network to a subchannel data rate, which is less than or equal to a B-channel data rate, for transmission on a subchannel of a B-channel, comprising the steps of:
   in a first rate adapter stage, receiving user data at a user data rate from a data terminal equipment and outputting, at an intermediate data rate selected depending on said user data rate, a first bitstream organized into a particular frame structure and comprising said received user data,
   in a second rate adapter stage, receiving said first bitstream and outputting, at said B-channel data rate, a second bitstream, organized into octets having a particular number of data bit positions, depending on said intermediate data rate, containing bits of said first bitstream, and other bit positions, containing a default binary value, and
   in a third rate adapter stage, receiving said second bitstream and outputting, on a subchannel at said subchannel data rate, a third bitstream organized into only octets comprising only bits contained in said data bit positions of octets of said second bitstream.

12. The process of claim 11 further comprising:
   in a fractional network termination unit, receiving said third bitstream via said subchannel in a bit stuffing circuit, and outputting, via said B-channel at said B-channel data rate, a fourth bitstream, organized into octets, having a particular number of data bit positions depending on said intermediate data rate, containing bits of said third bitstream, and other bit positions, containing a default binary value.

13. In an ISDN network comprising a fractional network termination unit having a data rate adapter circuit and a fractional terminal equipment having first, second and third rate adapter circuits, a process for adapting user data received from a B-channel at a B-channel data rate to a user data rate of a V-series data terminal equipment comprising:
   in a data rate adapter circuit of said fractional network termination unit, receiving a first bitstream via said B-channel organized into octets, having a particular number of data bit positions depending on said user data rate, and other bit positions containing default binary values, and outputting, via a subchannel of said B-channel at a subchannel data rate, which is less than or equal to said B-channel data rate, a second bitstream organized into only octets comprising bits of said data bit positions of said octets of said first bitstream,
   in said third rate adapter circuit of a fractional terminal equipment, receiving said second bitstream and outputting, at said B-channel data rate, a third bitstream, organized into octets, having a particular number of data bit positions depending on said user data rate, containing bits of said second bitstream, and other bit positions, containing default binary values, in said second rate adapter circuit of said fractional terminal equipment, receiving said third bitstream and outputting, at an intermediate data rate selected depending on said user data rate, a fourth bitstream comprising only bits contained in said data bit positions of said third bitstream, and in said first rate adapter circuit of said fractional terminal equipment, receiving said fourth bitstream and outputting user data comprised in frames of said fourth bitstream to a data terminal equipment, connected to said fractional terminal equipment, at said user data rate.

* * * * *